United States Patent
Yang et al.

(10) Patent No.: US 8,787,044 B2
(45) Date of Patent: Jul. 22, 2014

(54) ENERGY RECOVERY SNUBBER CIRCUIT FOR POWER CONVERTERS

(75) Inventors: Zaohong Yang, Richardson, TX (US); Paul Garrity, Rockwall, TX (US)

(73) Assignee: Flextronics AP, LLC, Broomfield, CO (US)

( * ) Notice: Subject to any disclaimer, the term of this patent is extended or adjusted under 35 U.S.C. 154(b) by 340 days.

(21) Appl. No.: 12/776,249

(22) Filed: May 7, 2010

(65) Prior Publication Data

US 2010/0315839 A1    Dec. 16, 2010

Related U.S. Application Data

(60) Provisional application No. 61/176,273, filed on May 7, 2009.

(51) Int. Cl.
*H02M 3/335* (2006.01)

(52) U.S. Cl.
USPC ......... 363/24; 363/17; 363/21.06; 363/21.14; 363/25; 363/26; 363/56.05; 363/56.07

(58) Field of Classification Search
CPC ........ H02M 3/335; H02M 1/12; H02M 3/155
USPC .............. 363/17, 53, 55, 56.01, 56.02, 56.11, 363/56.12, 56.05, 58, 65, 132, 127, 126, 363/21.01, 21.04, 21.06, 21.14, 50, 52
See application file for complete search history.

(56) References Cited

U.S. PATENT DOCUMENTS

| | | | |
|---|---|---|---|
| 4,273,406 A | 6/1981 | Okagami | |
| 4,370,703 A | 1/1983 | Risberg | |
| 4,563,731 A | 1/1986 | Sato et al. | |
| 4,645,278 A | 2/1987 | Yevak et al. | |
| 4,712,160 A | 12/1987 | Sato et al. | |

(Continued)

FOREIGN PATENT DOCUMENTS

| | | |
|---|---|---|
| JP | 4217869 A | 8/1992 |
| JP | 10243640 A | 9/1998 |

(Continued)

OTHER PUBLICATIONS

Texas Instrument, Control Driven Synchronous Rectifiers in Phase Shifted Full Brudge Converters, Mar. 2003, Texas Instruments.*

(Continued)

*Primary Examiner* — Bao Q Vu
(74) *Attorney, Agent, or Firm* — Haverstock & Owens LLP (57) ABSTRACT

An energy recovery snubber circuit for use in switching power converters. The power converters may include a switch network coupled to a primary winding of an isolation transformer, and rectification circuitry coupled to a secondary winding of the isolation transformer. The energy recovery snubber circuit may include clamping circuitry that is operative to clamp voltage spikes and/or ringing at the rectification circuitry. The clamped voltages may be captured by an energy capture module, such as a capacitor. Further, the energy recovery snubber circuitry may include control circuitry operative to return the energy captured by the energy capture module to the input of the power converter. To maintain electrical isolation between a primary side and a secondary side of the isolation transformer, a second isolation transformer may be provided to return the captured energy back to the input of the power converter.

21 Claims, 6 Drawing Sheets

(56) References Cited

U.S. PATENT DOCUMENTS

| | | |
|---|---|---|
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Tin et al. |
| 4,901,069 A | 2/1990 | Veneruso |
| 5,065,302 A | 11/1991 | Kanazawa |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,325,283 A | 6/1994 | Farrington |
| 5,351,182 A * | 9/1994 | Miyazaki et al. .............. 363/132 |
| 5,365,403 A | 11/1994 | Vinciarelli et al. |
| 5,373,432 A | 12/1994 | Vollin |
| 5,442,540 A | 8/1995 | Hua |
| 5,673,185 A | 9/1997 | Albach et al. |
| 5,712,772 A | 1/1998 | Telefus et al. |
| 5,786,992 A | 7/1998 | Vinciarelli et al. |
| 5,790,395 A | 8/1998 | Hagen |
| 5,811,895 A | 9/1998 | Suzuki et al. |
| 5,838,554 A | 11/1998 | Lanni |
| 5,859,771 A | 1/1999 | Kniegl |
| 5,898,581 A * | 4/1999 | Liu .............................. 363/53 |
| 5,905,369 A | 5/1999 | Ishii et al. |
| 5,923,543 A | 7/1999 | Choi |
| 5,949,672 A | 9/1999 | Bertnet |
| 5,978,238 A * | 11/1999 | Liu .............................. 363/56.09 |
| 6,009,008 A | 12/1999 | Pelly |
| 6,091,611 A | 7/2000 | Lanni |
| 6,128,206 A * | 10/2000 | Sun et al. .................... 363/127 |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranki |
| 6,459,175 B1 | 10/2002 | Potega |
| 6,487,098 B2 | 11/2002 | Malik et al. |
| 6,549,409 B1 | 4/2003 | Saxelby et al. |
| 6,578,253 B1 | 6/2003 | Herbert |
| 6,721,192 B1 | 4/2004 | Yang et al. |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 7,035,126 B1 | 4/2006 | Lanni |
| 7,038,406 B2 | 5/2006 | Wilson |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,564,706 B1 | 7/2009 | Herbert |
| 7,596,007 B2 | 9/2009 | Phadke et al. |
| 7,701,305 B2 | 4/2010 | Lin et al. |
| 7,830,684 B2 * | 11/2010 | Taylor ........................... 363/52 |
| 7,924,578 B2 | 4/2011 | Jansen et al. |
| 8,059,434 B2 | 11/2011 | Huang et al. |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,194,417 B2 | 6/2012 | Chang |
| 8,207,717 B2 | 6/2012 | Uruno et al. |
| 8,243,472 B2 | 8/2012 | Chang et al. |
| 8,344,689 B2 | 1/2013 | Boguslavskij |
| 8,369,111 B2 | 2/2013 | Balakrishnan et al. |
| 8,400,801 B2 | 3/2013 | Shinoda |
| 2002/0008963 A1 | 1/2002 | Dibene et al. |
| 2002/0011823 A1 | 1/2002 | Lee |
| 2002/0036200 A1 | 3/2002 | Ulrich et al. |
| 2003/0035303 A1 | 2/2003 | Balakrishnan et al. |
| 2003/0112645 A1 | 6/2003 | Schlecht |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2006/0002155 A1 | 1/2006 | Shteynberg et al. |
| 2006/0022637 A1 | 2/2006 | Wang et al. |
| 2006/0152947 A1 | 7/2006 | Baker et al. |
| 2006/0213890 A1 | 9/2006 | Kooken et al. |
| 2006/0232220 A1 | 10/2006 | Melis |
| 2007/0040516 A1 | 2/2007 | Chen |
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0196073 A1 | 8/2009 | Nakahori |
| 2009/0290384 A1 | 11/2009 | Jungreis |
| 2009/0300400 A1 | 12/2009 | DuBose |
| 2010/0039833 A1 | 2/2010 | Coulson et al. |
| 2010/0289466 A1 | 11/2010 | Telefus et al. |
| 2010/0317216 A1 | 12/2010 | Pocrass |
| 2010/0322441 A1 | 12/2010 | Weiss et al. |
| 2011/0132899 A1 | 6/2011 | Shimomugi et al. |
| 2011/0261590 A1 | 10/2011 | Liu |
| 2012/0112657 A1 | 5/2012 | Van Der Veen et al. |

FOREIGN PATENT DOCUMENTS

| | | |
|---|---|---|
| JP | 2000083374 A | 3/2000 |
| JP | 20000253648 A | 9/2000 |
| JP | 2004208357 A | 7/2004 |

OTHER PUBLICATIONS

EE Times.com—"Team Claims Midrange Wireless Energy Transfer", by R. Colin Johnson, 4 pages, Nov. 6, 2007.

EE Times. com—"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

\* cited by examiner

ENERGY RECOVERY SNUBBER CIRCUIT FOR POWER CONVERTERS

CROSS-REFERENCE TO RELATED APPLICATION

This application claims priority under 35 U.S.C. 119 to U.S. Provisional Application No. 61/176,273, entitled: "ENERGY RECOVERY SNUBBER CIRCUIT FOR POWER CONVERTERS," filed on May 7, 2009, the contents of which are incorporated herein as if set forth in full.

BACKGROUND

Generally, a power converter is a power processing circuit that converts an input voltage or current source into a specified output voltage or current. Power converters are used in numerous types of applications including computers, audio/video equipment, mobile electronic devices, power systems, and the like.

One type of power converter, known as a DC/DC power converter, is operative to convert an input voltage waveform having a DC component into an output DC voltage 15 waveform which may be at a different voltage level than the input voltage waveform. For various reasons, it is often desirable for the input to be electrically isolated from the output of the power converter. To accomplish this, an isolation transformer may be used, which may the input DC voltage to be "chopped" into an AC voltage. Further, in order to perform the waveform conversion from an AC output of the isolation transformer to a DC 20 output voltage, rectification circuitry may be used. Traditionally, rectification circuitry included one or more diodes coupled to the secondary side of the isolation transformer. Since diodes only conduct current when they are forward biased, they may be used to convert the AC voltage from the isolation transformer to an output DC voltage. Alternatively, the rectification circuitry may include synchronous rectifiers that utilize transistor switches that are selectively turned on and off synchronous with the AC signal being rectified in order to control the conduction of current from the isolation transformer to the rectifier output.

The increasing computational speeds and densities of integrated circuits (ICs) have led to a reduction of their operating voltages. This reduction of operating voltages requires DC/DC converters to provide higher output current to achieve similar power output. As the output voltage is decreased and the output current is increased, the power loss incurred by the output rectifiers becomes a dominant factor for the efficiency of the power converter.

In order to allow the use of relatively small energy storage elements and filtering components (e.g., capacitors, inductors, transformers, and the like), the switching devices associated with the power converter may be switched at a relatively high frequency (e.g., a few hundred kilohertz). However, this high frequency switching may cause large voltage spikes and high frequency ringing at the output rectification circuitry. The voltage spikes and high frequency ringing may generally be caused by the parasitic or leakage inductance of the isolation transformer and the parasitic capacitance of the rectification diodes or transistor switches.

The voltage spikes and high frequency ringing are undesirable for several reasons. For example, the high voltage spikes may require the use of rectification devices that are rated for high voltages, which may be costly and larger in size. Further, the use of high voltage rated devices may reduce the efficiency of the power converter because those devices may have relatively high conduction losses. Additionally, the energy transmitted by the high frequency ringing and high voltage potentials may induce electromagnetic interference (EMI) problems in the various components of the power converter or other surrounding components.

To deal with this problem, various passive and active snubber or clamping circuits have been developed to compensate for the above-noted undesirable properties. These circuits generally have one or more shortcomings that may include increased costs and/or reduced efficiency of the power converter.

It is against this background that the energy recovery snubber circuits for power converters described herein have been invented.

SUMMARY

Disclosed is an energy recovery snubber circuit for use in a switching power converter having an input and an output, the power converter including a first transformer having a primary winding and a secondary winding, a controllable switch coupled to the primary winding, and rectification circuitry coupled to the secondary winding. The energy recovery snubber circuit includes a voltage clamping element coupled to the rectification circuitry; a capacitive element coupled to the voltage clamping element for storing energy captured by the voltage clamping element; a second transformer having a primary winding coupled to the capacitive element and a secondary winding coupled to the input of the power converter; and control circuitry that is operative to selectively cause the transfer of energy stored by the capacitive element to the input of the power converter via the second transformer.

The power converter may include a low-pass filter at the output thereof. The low-pass filter may include an output inductor and an output capacitor. The energy recovery snubber circuit may include a rectifier coupled to the secondary winding of the energy recovery snubber circuit.

The voltage clamping element may include a rectifying switch. The rectifying switch may include a MOSFET. The voltage clamping element may include an inverter.

The controllable switch may include four different switches, two of which are on at a time, one pair of which are on while the other pair is off and one pair of which is off while the other pair is on. The voltage clamping element may include a first and a second rectifying switch, one of which is on at a time, the first rectifying switch being on when the one pair of switches in the controllable switch are on and the second rectifying switch being on when the other pair of switches in the controllable switch are on. The first and second rectifying switches may each include a MOSFET.

Also disclosed is a switching power converter having an input and an output. The power converter includes a first transformer having a primary winding and a secondary winding; a controllable switch coupled to the primary winding; rectification circuitry coupled to the secondary winding; and an energy recovery snubber circuit for the switching power converter. The energy recovery snubber circuit includes a voltage clamping element coupled to the rectification circuitry; a capacitive element coupled to the voltage clamping element for storing energy captured by the voltage clamping element; a second transformer having a primary winding coupled to the capacitive element and a secondary winding coupled to the input of the power converter; and control circuitry that is operative to selectively cause the transfer of energy stored by the capacitive element to the input of the power converter via the second transformer.

The power converter may include a low-pass filter at the output thereof. The low-pass filter may include an output inductor and an output capacitor. The energy recovery snubber circuit may include a rectifier coupled to the secondary winding of the energy recovery snubber circuit.

The voltage clamping element may include a rectifying switch. The rectifying switch may include a MOSFET. The voltage clamping element may include an inverter.

The controllable switch may include four different switches, two of which are on at a time, one pair of which are on while the other pair is off and one pair of which is off while the other pair is on. The voltage clamping element may include a first and a second rectifying switch, one of which is on at a time, the first rectifying switch being on when the one pair of switches in the controllable switch are on and the second rectifying switch being on when the other pair of switches in the controllable switch are on. The first and second rectifying switches may each include a MOSFET.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 1:
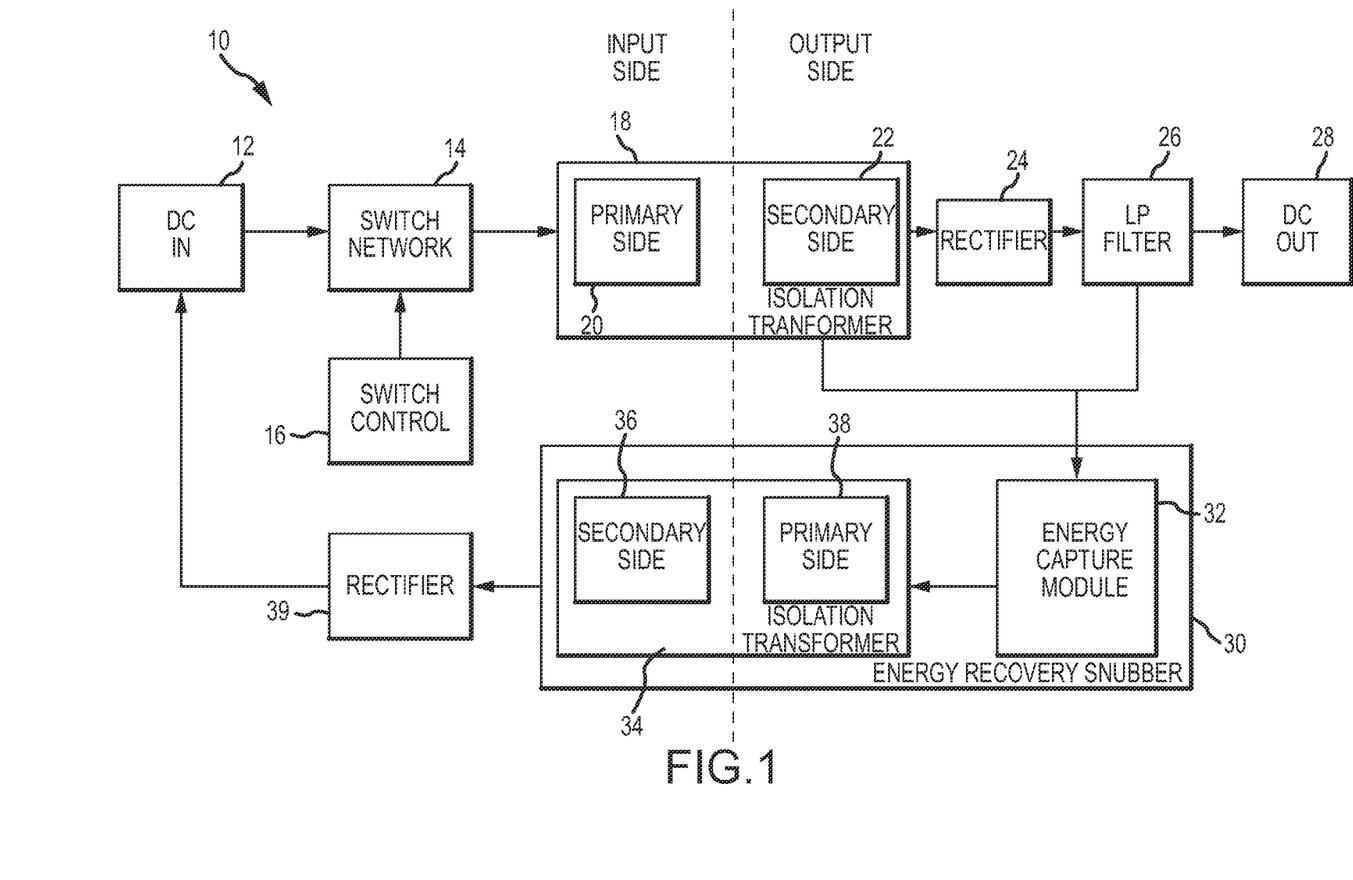
FIG. 1 illustrates a block diagram of a DC/DC power converter that includes an exemplary energy recovery snubber circuit.

FIG. 1 illustrates a block diagram of a DC/DC power converter 10 that includes an exemplary energy recovery snubber 30. The power converter 10 may be operative to convert a DC voltage from a DC input node 12 into an output DC voltage at a DC output node 28. The power converter 10 may include an isolation transformer 18 having one or more primary side windings 20 coupled to the DC input node 12 and one or more secondary side windings 22 coupled to the DC output node 28. To provide an AC voltage to the primary winding 20 of the isolation transformer 18, a switch network 14 including one or more switches may be coupled between the primary winding 20 and the DC input node 12. The switch network 14 may be controlled by a switch control module 16 that is operative to turn the switches of the switch network 14 on and off to provide an AC voltage to the primary winding 20 of the isolation transformer 18. As an example, the switch network 14 may include a half bridge network, a full bridge network, or the like.

Rectification circuitry 24 may be coupled to the one or more secondary windings 22 of the isolation transformer 18 to provide a rectified voltage waveform. The rectification circuitry 24 may include one or more diodes, one or more synchronous rectifiers (e.g., transistor switches), or the like. The rectified voltage waveform may then be smoothed by a low pass (LP) filter 26, such that a DC voltage appears a the DC output node 28, which in turn may be coupled to a load. The LP filter 26 may include one or more capacitors, inductors, or other passive or active components.

To reduce the high voltage spikes and high frequency ringing caused by the high frequency switching of the switch network 14 and its effect on the leakage inductance of the isolation transformer 18 and the rectification circuitry 24, the energy recovery snubber 30 may be provided. Functionally, the energy recovery snubber 30 may include an energy capture module 32 that may operate to capture energy that causes the undesirable behavior (e.g., ringing and voltage spikes) at the rectification circuitry 24. In this regard, the rectification circuitry 24 may be designed such that its components are not required to withstand extreme voltage conditions, which may reduce the cost of the power converter 10 while increasing its efficiency.

In addition to capturing the energy, the energy recovery snubber 30 may be operative to return the captured energy to the DC input node 12, which may substantially improve the efficiency of the power converter 10. To return the captured energy to the DC input node 12 and to preserve the electrical isolation between the primary side and secondary side of the power converter 10, the energy recovery snubber 30 may include an isolation transformer 34 having one or more primary side windings 38 and one or more secondary side windings 34. In operation, the energy captured by the energy capture module 32 may be transferred across the isolation transformer 34, where it may be rectified by a rectifier 39, and returned to the DC input node 12. In this regard, the energy that is normally wasted by the leakage inductance of the isolation transformer 18 and the parasitic capacitance of the rectification circuitry 24 may be recovered or recycled by the power converter 10, thereby improving the efficiency of the power converter 10 while reducing the high voltage spikes and high frequency ringing on the rectification circuitry 24.

Figure 2:
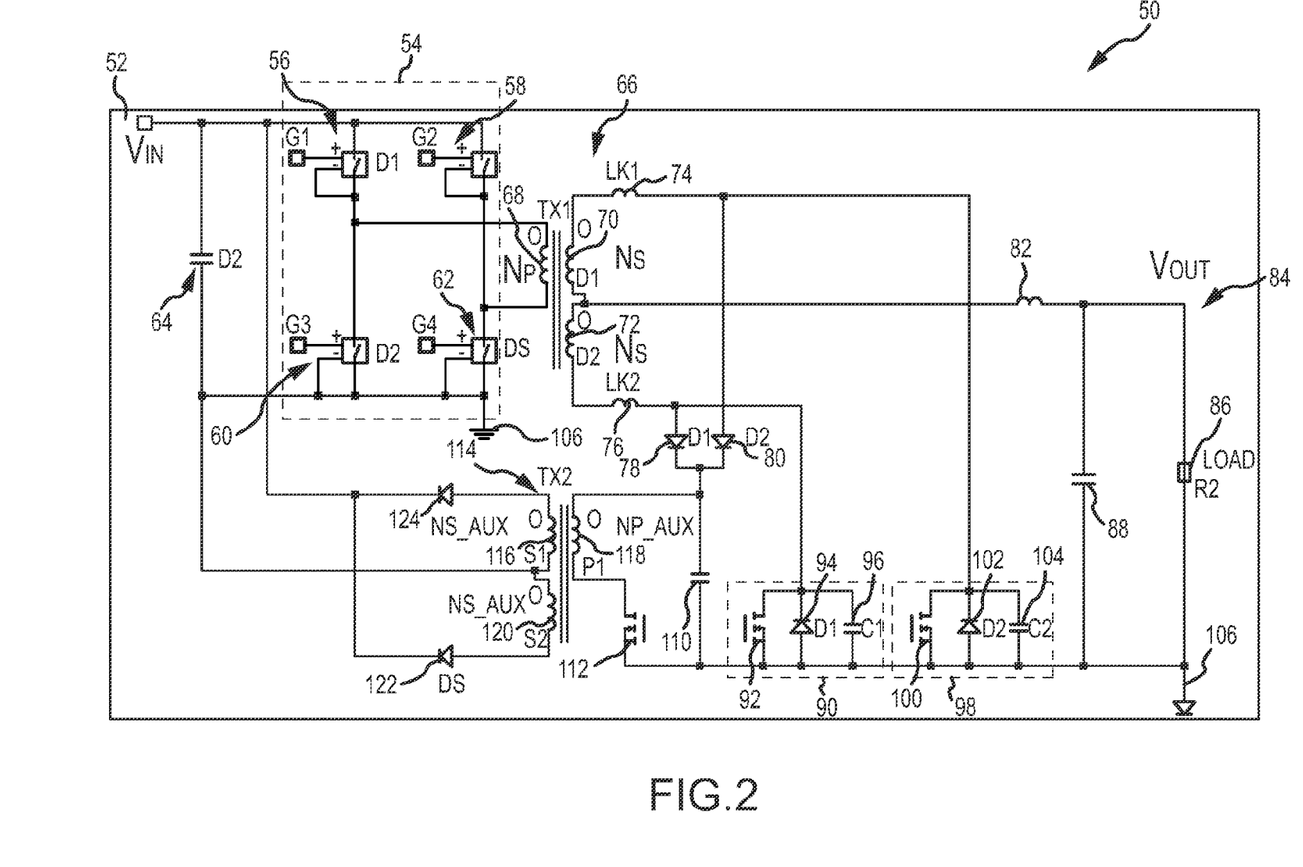
FIG. 2 illustrates a schematic diagram of a DC/DC power converter that includes an exemplary energy recovery snubber circuit.

FIG. 2 illustrates a schematic diagram of a full bridge DC/DC power converter 50 that includes an exemplary energy recovery snubber circuit. The power converter 50 includes an isolation transformer 66 that is coupled to an input node 52 (Vin) via a switch network 54. The switch network includes switches 56, 58, 60, and 62 which may be any suitable type of switches including MOSFETs, IGBTs, or the like. The switches 56, 58, 60, and 62 may be controlled by a switch controller (not shown in FIG. 2) to provide an AC voltage to a primary winding 68 of the transformer 66. In operation, the switches 56 and 62 may conduct for a period of time such that positive Vin voltage potential is applied across the primary winding 68 of the transformer 66. During this time, switches 58 and 60 are open (i.e., not conducting). Next, the switch controller may control the switches 56 and 62 to be non-conducting, while the switches 58 and 60 are conducting. As can be appreciated, this has the effect of applying a negative Vin voltage potential across the primary winding 68 of the transformer 66. In this regard, the switch controller may selectively control the switches 56, 58, 60, and 62 to apply an AC voltage to the primary winding 68 that swings between positive Vin and negative Vin voltage potentials.

The power converter 50 also includes synchronous rectifiers 90, 98 that are coupled to outer taps of secondary windings 70, 72 of the isolation transformer 66. In this example, the synchronous rectifiers 90, 98 include MOSFETS 92, 100, respectively. Further, body diodes 94, 102 and capacitors 96, 104 are illustrated to show the characteristics (i.e., equivalent circuits) of the MOSFETS 92, 100, respectively, and are not separate components in the circuit.

In operation, the gates of the MOSFETS 92, 100 are controlled by a rectification controller (not shown) to cause the MOSFETS 92, 100 to conduct at certain distinct times such that energy from the primary winding 68 of the isolation transformer 66 may be transferred to a load 86. More specifically, when the switches 56 and 62 are conducting, the MOSFET 92 should be conducting. Similarly, when the switches 58 and 60 are conducting, the MOSFET 100 should be conducting. In this regard, the energy from the secondary windings 70, 72 of the isolation transformer 66 may be rectified. In this example, the MOSFETS 92, 100 are used for rectification instead of rectification diodes because of their relatively low resistance they exhibit when conducting, which has the effect of minimizing the losses associated with the rectification circuitry.

To provide a stable DC voltage to the output node 84 (Vout) of the power converter 50, a low pass filter that includes an output inductor 82 and an output capacitor 88 may be provided. The values for the inductor 82 and the capacitor 88 may be chosen such that the voltage Vout is approximately a DC voltage when the power converter 50 is coupled to the load 86.

As noted above, high frequency ringing and voltage spikes may be generated due to the fast transitioning of the rectifiers (i.e., the MOSFETS 92, 100) from a conducting stage to a non-conducting stage. These undesirable characteristics are mainly due to resonance between the leakage inductance of the isolation transformer 66 (shown schematically as leakage inductors 74 and 76) and the parasitic capacitance between the drain and source terminals of the rectifiers 90, 98 (shown schematically as capacitors 96, 104, respectively).

To reduce or eliminate the high voltage spikes and ringing that occurs when the MOSFETS 92, 100 are turned off, clamping diodes 78, 80 are provided which have their respective anode terminals coupled to the outside ends of the secondary windings 72, 74 of the isolation transformer 66, and having their cathode terminals coupled to a first plate of a clamping capacitor 110.

The clamping diodes 78, 80 may be any type of suitable diodes. For example, the clamping diodes 78, 80 may be Schottky diodes in order to provide a relatively small forward bias voltage drop. The clamping capacitor 110 may be relatively large (e.g., 30 nF, 60 nF, 220 nF, or more) such that any voltage spikes or ringing that appear at the outside ends of the secondary windings 72, 74 (or equivalently, at the drain terminals of the MOSFETS 92, 100) are absorbed by the clamping capacitor 110. As can be appreciated, the voltage appearing across the clamping capacitor 110 is substantially a DC voltage that has an amplitude that is approximately the input voltage Vin multiplied by the turns ratio of the isolation transformer 66.

In addition to the clamping capacitor 110 and the clamping diodes 78, 80 acting to clamp excessive voltage spikes and ringing, the energy absorbed by the clamping capacitor 110 may also be recycled back to the input node 52 of the power converter 50. To achieve this functionality, the clamping capacitor 110 may be coupled to a ground potential 106 in parallel with a primary winding 118 of an isolation transformer 114 and a MOSFET 112. The transformer 114 may include two secondary windings 116, 120 that each have one end couple to a ground node 106 on the primary side of the power converter 50 and the other end to the input node 52 through rectifying diodes 124, 122, respectively.

In operation, the MOSFET 112 may be selectively turned on and off by control circuitry (not shown in FIG. 2; see a control circuit 150 shown in FIG. 4 and a control circuit 160 shown in FIG. 6) coupled to its gate terminal. When the MOSFET 112 is turned on by the control circuitry, current will flow from the clamping capacitor 110 through the primary winding 118 of the transformer 114, inducing a voltage across the primary winding 118. This voltage will in turn induce a voltage in the secondary winding 116, which may cause current to flow through the rectifying diode 124 to the input node 52, where the energy may be stored by an input capacitor 64. Additionally, when the MOSFET 112 is subsequently opened or turned off, the energy stored in the primary winding 118 will cause a negative voltage across the secondary winding 120, thereby causing current to flow through the rectifying diode 122 to the input node 52. In this regard, the energy captured by the clamping capacitor 110 is transferred back to the input source, such that the energy loss of the power converter 50 is substantially reduced.

Figure 3:
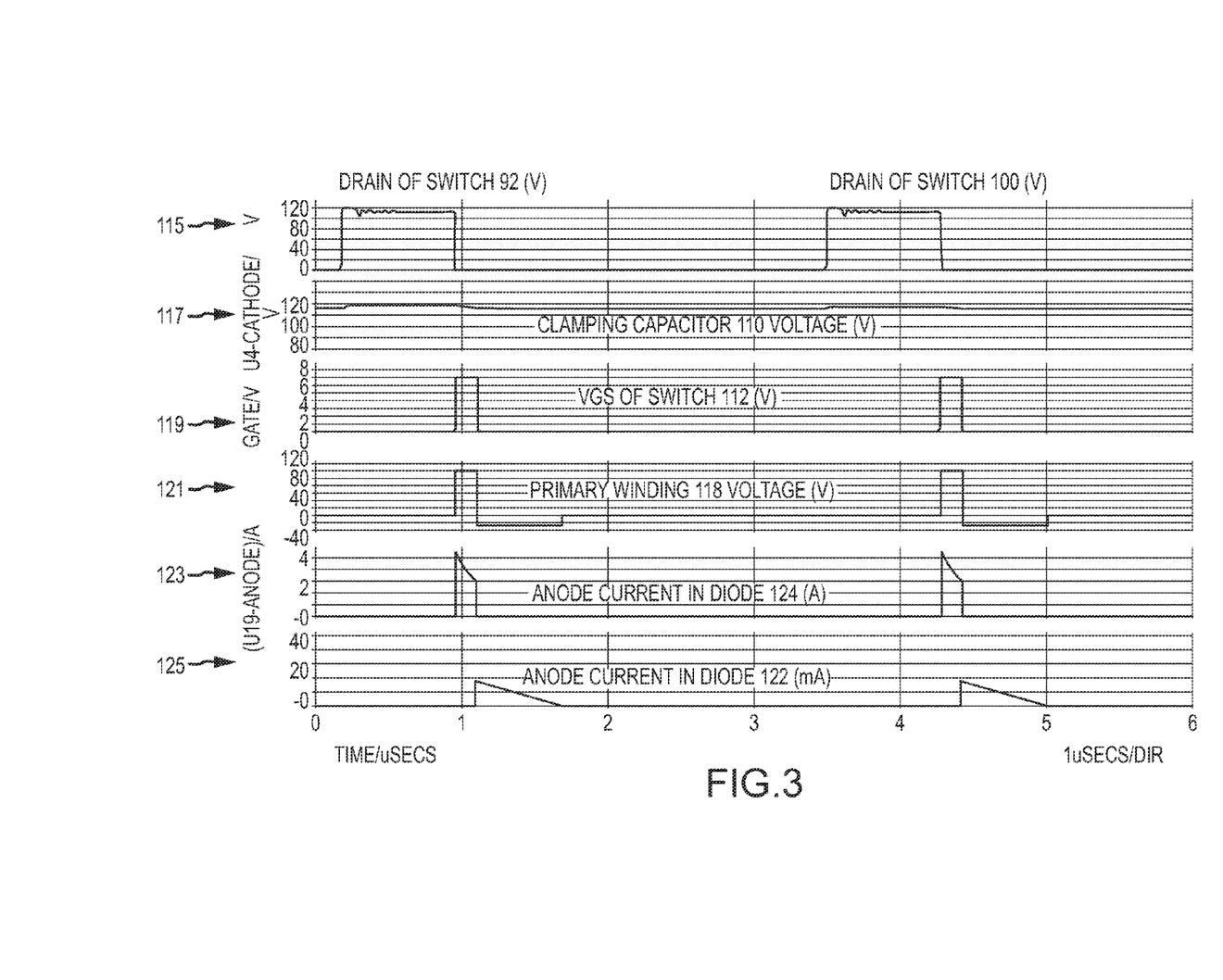
FIG. 3 illustrates various waveforms associated with the operation of the DC/DC power converter shown in FIG. 2.

FIG. 3 illustrates various waveforms associated with the operation of the DC/DC power converter 50 shown in FIG. 2. In particular, the waveform 115 illustrates the voltage between the drain and the source terminals of the MOSFETS 92 and 100. As can be seen, the voltage across the MOSFETS 92, 100 rises sharply as they transition from a conducting stage to a non-conducting stage, and falls again as they transition back to a conducting stage. The waveform 117 illustrates the voltage across the clamping capacitor 110. The waveform 119 illustrates the voltage between the gate and source terminals (Vgs) of the MOSFET 112, which may be controlled by control circuitry (see the control circuit 150 and 160 shown in FIGS. 4 and 6). As noted above, the MOSFET 112 is used to control the discharging of the clamping capacitor 110. The waveform 121 illustrates the voltage across the primary winding 118 of the isolation transformer 114 as the energy from the clamping capacitor 110 is being recovered. The waveform 123 illustrates the current flowing through the diode 124 back to the input node 52, while the waveform 125 illustrates the current flowing through the diode 125 back to the input node 52.

As shown in the waveforms 115 and 117, the voltage across the clamping capacitor 110 increases slightly when the switch 92 is turned off (shown in waveform 115 when the voltage across the switch 92 rises). Further, it should be noted that any voltage spikes or ringing across the switches 92 and 100 are relatively small due to the energy being captured by the clamping capacitor 110.

As shown in the waveform 119, control circuitry applies a positive voltage to the gate of the MOSFET switch 112 for a predetermined time after the MOSFETS 92 or 100 begin conducting again (i.e., when the voltage in the waveform 115 falls back to zero). This has the effect of inducing a positive voltage on the primary winding 118 of the transformer 114 (shown in waveform 121), which in turn induces a current through the diode 124 (shown in the waveform 123) which returns the captured energy to the input node 52. Then, when the switch 112 is turned off by the control circuitry, a relatively small negative voltage is induced in the primary winding 118 of the transformer (waveform 121), which in turn induces a relatively small current (a few mA) through the diode 122 (waveform 125). As noted above, the current through the diodes 122 and 124 is returned back to the input node 52 of the power converter 50, thereby reducing the power loss and increasing the efficiency of the power converter 50.

Figure 4:
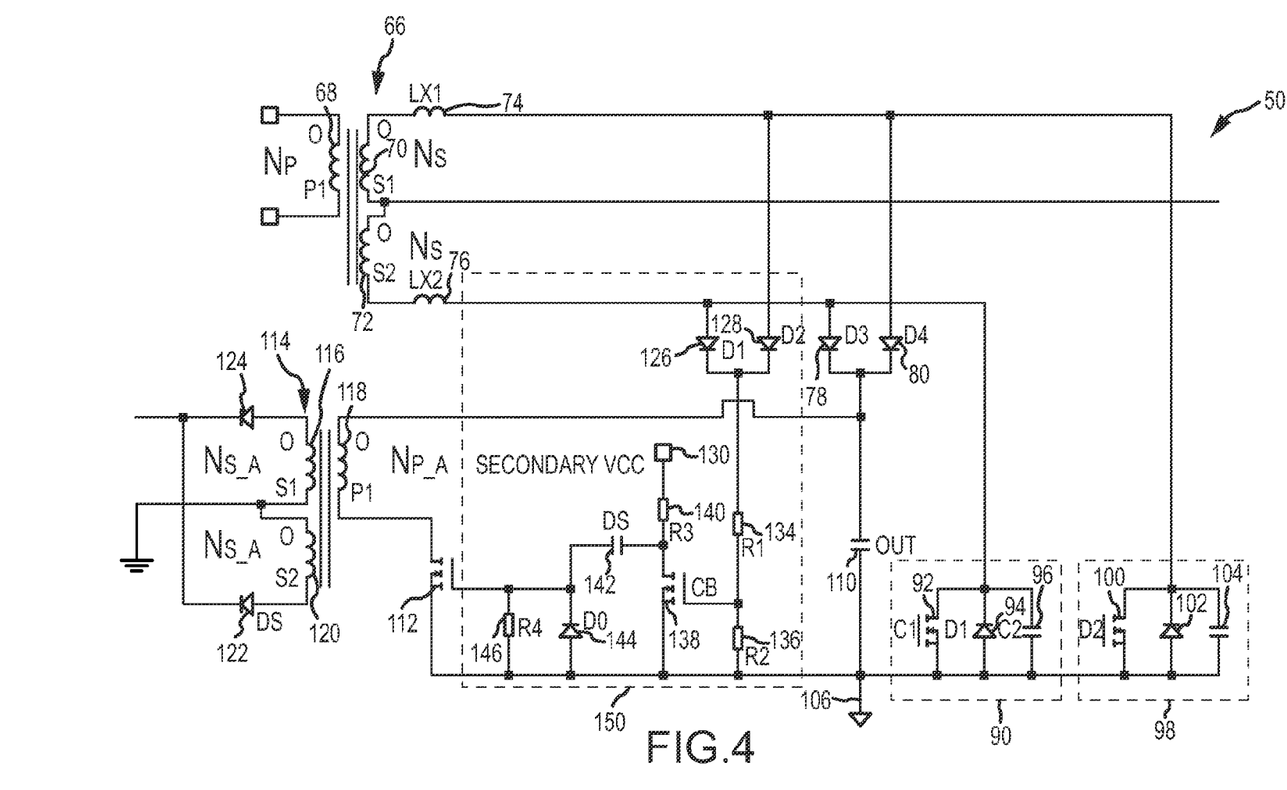
FIG. 4 illustrates an exemplary energy recovery snubber circuit.

FIG. 4 illustrates the power converter 50 also shown in FIG. 2, and further illustrates a control circuit 150 that may be utilized to control the opening and closing of the switch 112. It is noted that for simplicity, not all components of the power converter 50 shown in FIG. 2 are shown in FIG. 4, but it should be appreciated that the components not shown in FIG. 4 may still be actually present in the power converter 50.

Generally, the control circuit 150 is operative to turn on the switch 112 for a short, predetermined period of time after the voltage across the MOSFETS 92 or 100 has dropped to approximately zero (e.g., after the MOSFETS 92, 100 transition from a non-conducting stage to a conducting stage; see waveform 115 in FIG. 3). To achieve this functionality, the control circuit 150 may include diodes 126 and 128 having their anode terminals coupled to the drain terminals of the MOSFETS 92 and 100, respectively, and the cathode terminals of the diodes 126 and 128 connected to a gate terminal of a MOSFET 138 through a voltage divider (i.e., resistors 134 and 136). The resistance values for the resistors 134 and 136 may be chosen such that a voltage potential sufficient to turn on the MOSFET 138 is present when the voltage across either of the MOSFETS 92 and 100 is high. In this regard, when the MOSFETS 92, 100 are not conducting, the MOSFET 138 is conducting or "turned on."

The control circuit 150 also includes a charging capacitor 142 that has one plate coupled to the drain terminal of the MOSFET 138 and to a voltage source 130 (Vcc) through a resistor 140. Further, the other plate of the charging capacitor 142 is coupled to the gate terminal of the MOSFET 112, and to ground through a resistor 146 and a diode 144 that are configured in parallel to each other.

In operation, the charging capacitor 142 is used to control the "on time" of the MOSFET 112. Initially, the voltage across the charging capacitor 142 is zero when the MOSFET 138 is conducting (e.g., when either of the MOSFETS 92, 100 are non-conducting, an their drain to source voltage is high). When the MOSFETS 92, 109 transition to a non-conducting stage, the voltage at the gate terminal of the MOSFET 138 drops to zero, and the MOSFET 138 becomes non-conducting. This causes a current to flow from the voltage source 130 (Vcc) through the resistor 140, through the charging capacitor 142, through the resistor 146, to the ground node 106. The resistors 146 and 140 may be chosen such that the voltage at the gate terminal of the MOSFET 112 is sufficient to turn on the MOSFET 112 as the charging capacitor 142 is charging. As can be appreciated, the charging capacitor 142 will charge at a rate determined by the RC time constant, and the voltage at the gate terminal of the MOSFET 112 will eventually fall to level that turns the MOSFET 112 off. In this regard, the MOSFET 112 will be turned on for a predetermined period of time that is triggered by the MOSFETS 92, 100 transitioning from a conducting stage to a non-conducting stage (see the waveforms 115 and 119 shown in FIG. 3).

Then, the above process will repeat each switching cycle so that the MOSFET 112 is turned on for a short period of time each cycle to permit energy stored in the clamping capacitor 110 to be transferred back to the input of the power converter 50 via the isolation transformer 114. To ensure that the charging capacitor 142 discharges fully each cycle, the diode 144 is coupled between the capacitor 142 and ground 106.

Figure 5:
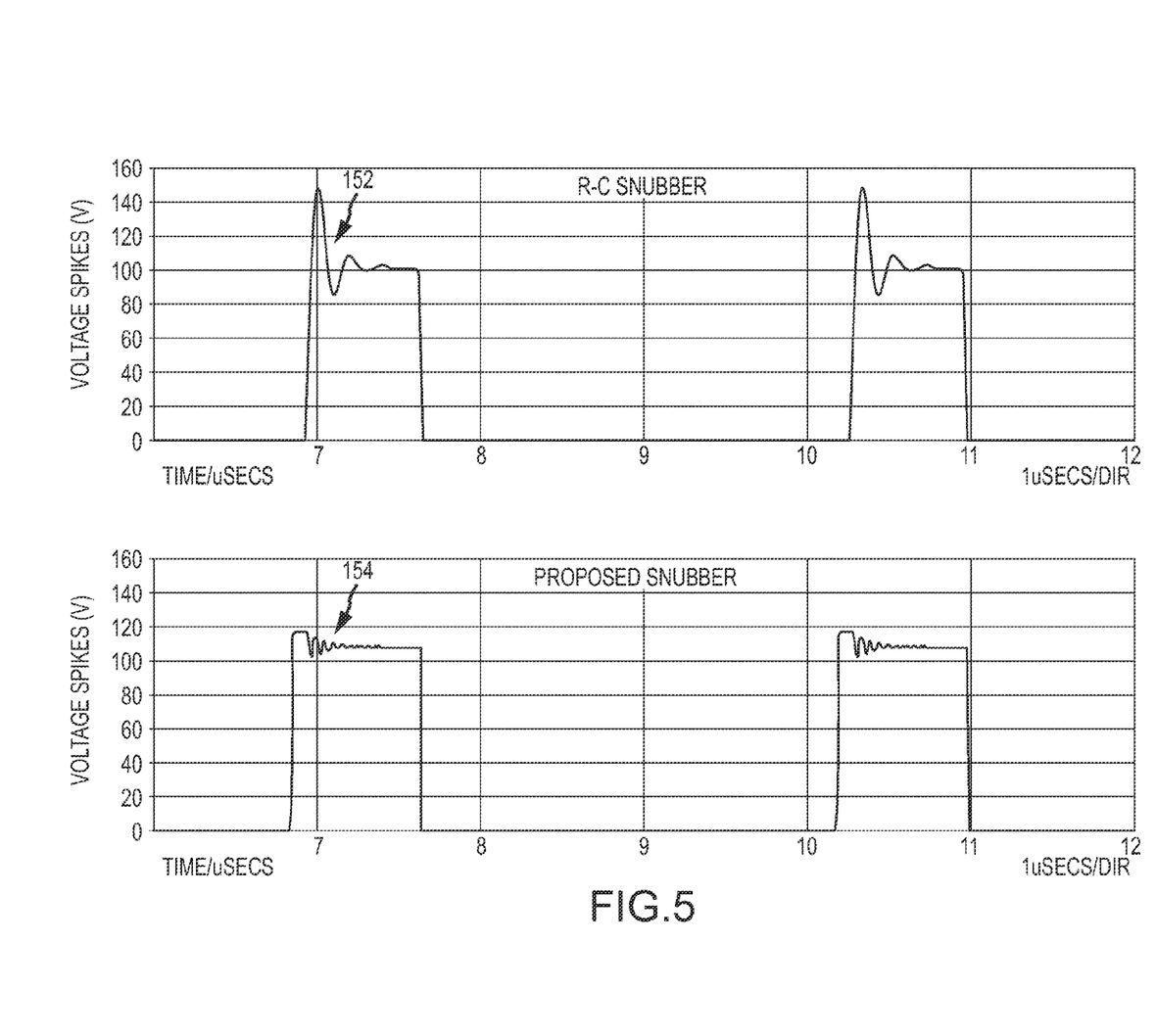
FIG. 5 illustrates voltage waveforms for rectification circuitry used in DC/DC power converters.

FIG. 5 demonstrates the ability of the present energy recovery snubber to clamp voltages so as to reduce voltage spikes and ringing effects. The top figure shows a voltage waveform 152 appearing across a synchronous rectifier using a passive, resistive-capacitive (R-C) snubber circuit. The bottom figure shows a voltage waveform 154 appearing across a synchronous rectifier when the present energy recovery snubber circuit is employed. As can be seen in FIG. 5, the voltage spike and ringing are substantially reduced using the present energy recovery snubber circuit.

Figure 6:
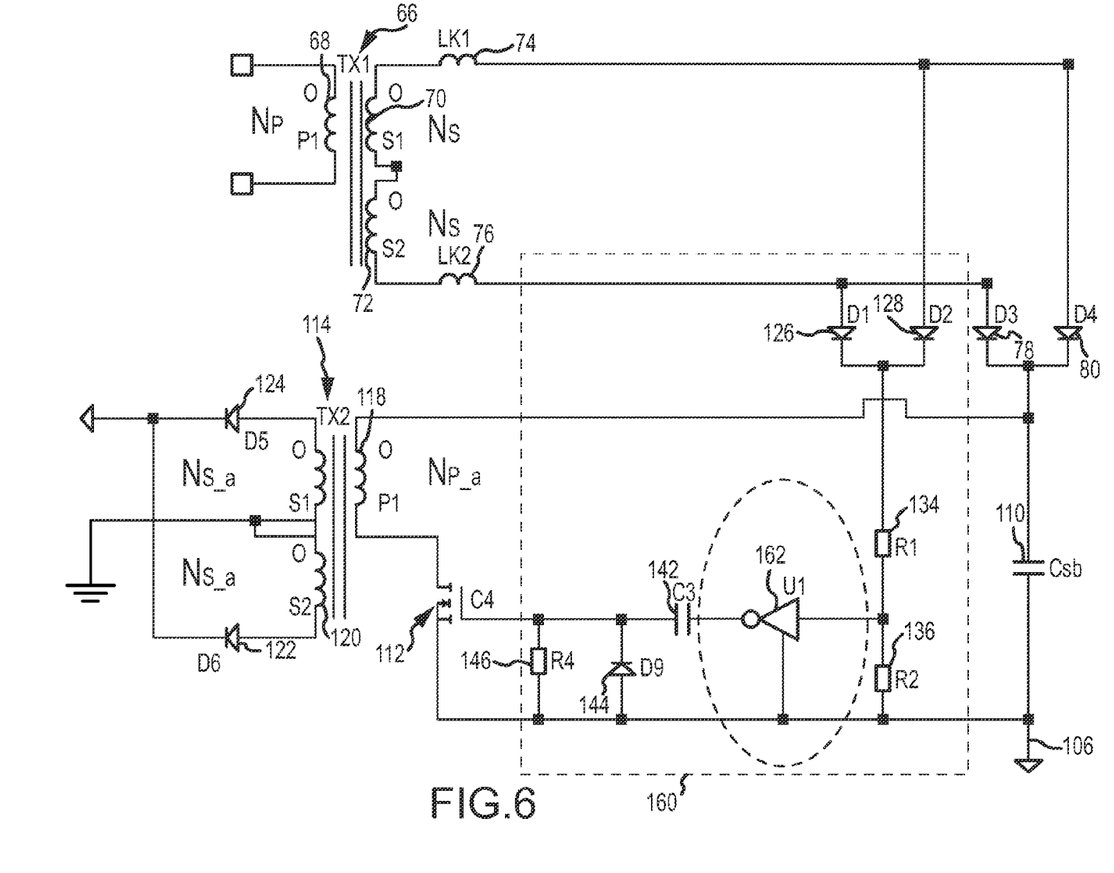
FIG. 6 illustrates another exemplary energy recovery snubber circuit.

FIG. 6 illustrates the power converter 50 also shown in FIG. 2 and FIG. 4, and further illustrates a control circuit 160 that may be utilized to control the opening and closing of the switch 112. As with FIG. 4, it is noted that for simplicity, not all components of the power converter 50 shown in FIG. 2 are shown in FIG. 6, but it should be appreciated that the components not shown in FIG. 6 may still be actually present in the power converter 50.

The control circuit 160 is similar to the control circuit 150 shown in FIG. 4, except that an inverter 162 has replaced the MOSFET 138 and the resistor 140 coupled to the voltage source 130 (Vcc). In operation, when the rectifying MOSFETS 92, 100 are in a non-conducting stage, the charging capacitor 142 has zero voltage potential across its terminals because the input of the inverter 162 is high, while the output, which is coupled to the capacitor 142, is low. Then, as the voltage at the input of the inverter drops to zero when the MOSFETS 92, 100 transition to a conducting stage, the output of the inverter 162 becomes high, thereby charging the capacitor 142 and turning on the switch 112. Similar to the control circuit 150 shown in FIG. 4, the switch 112 remains on for a period of time determined by the RC time constant of the capacitor 142 and the resistor 146. Additionally, the diode 144 is provided to ensure that the charging capacitor 142 is fully discharged each switching cycle.

As can be appreciated, the conduction period of the MOSFET 112 shown in FIGS. 2, 4, and 6 may be controlled by selecting appropriate values for the charging capacitors and associated resistors. Generally, it is desirable for the MOSFET 112 to remain on for a time period that allows the energy captured by the clamping capacitor 110 during the switching cycle to be recovered. In this regard, the voltage potential across the clamping capacitor 110 will remain relatively steady over time.

It should be appreciated that the embodiments described herein are exemplary and that the various features may be applicable in numerous applications. For example, various types of transformers, switches, or other components may be used. Further, the features described herein may be used with other types of power converters, such as AC-DC power converters. Additionally, in addition to a full bridge DC-DC converter, the features described herein may be used with other configurations including push-pull converters, half-bridge converters, forward converters, and the like.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed:

1. An energy recovery snubber circuit for use in a switching power converter having an input and an output, the power converter comprising a first transformer having a primary winding and a secondary winding, a controllable switch coupled to the primary winding, and rectification circuitry coupled to the secondary winding, the energy recovery snubber circuit comprising:

a voltage clamping element coupled to the rectification circuitry;

a capacitive element coupled to the voltage clamping element for storing energy captured by the voltage clamping element;

a second transformer having a primary winding coupled to the capacitive element and a secondary winding coupled to the input of the power converter; and control circuitry operably connected to the rectification circuitry, wherein the rectification circuitry triggers the control circuitry to, independent of the amount of energy stored by the capacitive element, selectively cause energy stored by the capacitive element to transfer to the input of the power converter via the second transformer.

2. A circuit as defined in claim 1, wherein the power converter includes a low-pass filter at the output thereof.

3. A circuit as defined in claim 2, wherein the low-pass filter includes an output inductor and an output capacitor.

4. A circuit as defined in claim 1, wherein the power converter includes a rectifier coupled to the secondary winding of the energy recovery snubber circuit.

5. A circuit as defined in claim 1, wherein the rectification circuitry includes a rectifying switch.

6. A circuit as defined in claim 5, wherein the rectifying switch includes a MOSFET.

7. A circuit as defined in claim 1, wherein the controllable switch includes four different switches, two of which are on at a time, one pair of which are on while the other pair is off and one pair of which is off while the other pair is on.

8. A circuit as defined in claim 7, wherein the rectification circuitry includes a first and a second rectifying switch, one of which is on at a time, the first rectifying switch being on when the one pair of switches in the controllable switch are on and the second rectifying switch being on when the other pair of switches in the controllable switch are on.

9. A circuit as defined in claim 8, wherein the first and second rectifying switches include a MOSFET.

10. A circuit as defined in claim 1, wherein the voltage clamping element includes one or more diodes and the control circuitry includes an inverter.

11. A switching power converter having an input and an output, the power converter comprising:
a first transformer having a primary winding and a secondary winding;
a controllable switch coupled to the primary winding;
rectification circuitry coupled to the secondary winding; and
an energy recovery snubber circuit for the switching power converter, the energy recovery snubber circuit comprising:
a voltage clamping element coupled to the rectification circuitry;
a capacitive element coupled to the voltage clamping element for storing energy captured by the voltage clamping element;
a second transformer having a primary winding coupled to the capacitive element and a secondary winding coupled to the input of the power converter; and
control circuitry operably connected to the rectification circuitry, the rectification circuitry triggers the control circuitry to, independent of the amount of energy stored by the capacitive element, selectively cause energy stored by the capacitive element to transfer to the input of the power converter via the second transformer.

12. A circuit as defined in claim 11, wherein the power converter includes a low-pass filter at the output thereof.

13. A circuit as defined in claim 12, wherein the low-pass filter includes an output inductor and an output capacitor.

14. A circuit as defined in claim 11, wherein the power converter includes a rectifier coupled to the secondary winding of the energy recovery snubber circuit.

15. A circuit as defined in claim 11, wherein the rectification circuitry includes a rectifying switch.

16. A circuit as defined in claim 15, wherein the rectifying switch includes a MOSFET.

17. A circuit as defined in claim 11, wherein the controllable switch includes four different switches, two of which are on at a time, one pair of which are on while the other pair is off and one pair of which is off while the other pair is on.

18. A circuit as defined in claim 17, wherein the rectification circuitry includes a first and a second rectifying switch, one of which is on at a time, the first rectifying switch being on when the one pair of switches in the controllable switch are on and the second rectifying switch being on when the other pair of switches in the controllable switch are on.

19. A circuit as defined in claim 18, wherein the first and second rectifying switches include a MOSFET.

20. A circuit as defined in claim 11, wherein the voltage clamping element includes one or more diodes and the control circuitry includes an inverter.

21. A circuit as defined in claim 1, wherein the voltage clamping element is directly coupled to the secondary winding of the first transformer between the secondary winding and the rectification circuitry such that the voltage clamping element receives a non-rectified output of the first transformer.

* * * * *